United States Patent [19]
Lustig et al.

[11] 3,946,267
[45] Mar. 23, 1976

[54] PLURAL FILTER SYSTEM COOPERATING WITH CATHODE RAY DISPLAY WITH LANTHANUM HOST PHOSPHOR EMISSIVE IN TWO COLORS

[75] Inventors: Claude D. Lustig, Lexington; James B. Thaxter, Townsend, both of Mass.

[73] Assignee: Sperry Rand Corporation, New York, N.Y.

[22] Filed: Feb. 3, 1975

[21] Appl. No.: 546,644

[52] U.S. Cl. ............... 313/473; 313/474; 178/7.86
[51] Int. Cl.² ..................... H01J 29/20; H01J 31/20
[58] Field of Search .......... 313/474, 468, 473, 478; 178/7.86

[56] References Cited
UNITED STATES PATENTS

| | | |
|---|---|---|
| 3,454,715 | 7/1969 | Larach et al................... 313/468 X |
| 3,638,060 | 1/1972 | Wacher............................ 313/467 X |
| 3,875,449 | 4/1975 | Byler et al. ..................... 313/468 X |
| 3,886,394 | 5/1975 | Lipp.................................... 313/470 |

*Primary Examiner*—Robert Segal
*Attorney, Agent, or Firm*—Howard P. Terry

[57] ABSTRACT

An optical filter system is provided for use with a penetration phosphor cathode ray tube of the special kind in which $La_2O_2S$ particles are employed as the carrier hosts in the cathodo-luminescent penetration phosphor composition. Tb and Eu ions are used in low concentrations as activators in the control of red and green optical line emission from within a film of the activated host phosphor material. The filter system, bonded to the face plate of the cathode ray tube, provides contrast enhancement with respect to ambient light reflected from that face plate, greatly increasing the equivalent brightness of the color display.

6 Claims, 7 Drawing Figures

PLURAL FILTER SYSTEM COOPERATING WITH CATHODE RAY DISPLAY WITH LANTHANUM HOST PHOSPHOR EMISSIVE IN TWO COLORS

BACKGROUND OF THE INVENTION

1. Field of the Invention

The invention relates to cathode ray tube display devices suitable for use in high ambient light level conditions and, in particular, concerns an optical filter arrangement for enhancing the brightness of the red and green spectral line display generated by a penetration phosphor cathode ray display device.

2. Description of the Prior Art

Cathode ray display tubes satisfactory for application in information displays such as air traffic control, radar, data processing, and the like systems have unusual requirements generally not met by cathode ray tubes of the type conventionally available for color television viewing. In particular, they often do not require the many colors needed for a television screen; for example, the provision of blue may even be undesirable. While red and green are readily simultaneously focused by the optics of the normal eye at the sensitive high resolution fovea, the blue component of the image is normally out of focus and its presence may even tire the eye. Further, the very center of the fovea is red and green sensitive, but blue is not appreciably sensed there. Since red and green light may purposely be mixed so as to yield the sensations of orange or of yellow in the eye, a wide range of colors adequate for information displays is available without the use of blue.

Further features are desirable in an information display; a major need is to provide brightness and contrast when the display is viewed in a high ambient light level, including sunlight, whereas conventional color cathode ray television tubes are useful only at low or medium light levels. High resolution, especially in the center of the screen, not available in conventional tubes, is also desired. Relatively simple electron beam focusing and scanning elements are also desired so that either raster scanning or random beam positioning as both often required for presenting computer information are easily achieved.

The penetration phosphor cathode ray display tubes of the prior art offer several of the advantages required in specialized information displays, but the most suitable penetration phosphor indicator for use in information displays is that disclosed by S. F. Ignasiak in patent application Ser. No. 505,710, filed Sept. 13, 1974 for "Penetration Phosphors and Display Devices" and assigned to Sperry Rand Corporation. The penetration phosphor color display of the Ignasiak invention overcomes many defects inherent in prior art color displays, again permitting much more information to be displayed effectively simultaneously than by a black and white tube. Additionally, recognition of individual data representations in the displayed material when colored is much more rapid than in a monochromatic or black and white display.

Full use may be made of the penetration phosphor characteristics of the Ignasiak invention in providing a variable color display while using only one electron beam simply by controlling the voltage on the beam acceleration electrode adjacent the cathode. With red and green emitting phosphors, successive changes in the beam acceleration voltage generate distinct colors; for example, red, orange, yellow, or green may thus be generated. Only one suitably controlled electron gun is required and the complexities of prior art color television tubes are eliminated along with other features of prior art display devices undesirable in information displays.

SUMMARY OF THE INVENTION

The present invention relates to an optical filter system for use with the penetration phosphor color display tube of the aforementioned Ignasiak patent application Ser. No. 505,710 for providing maximum contrast enhancement with respect to ambient light reflected from the face plate of the cathode ray tube. The display device of the Ignasiak invention supplies improved and efficient penetration phosphors overcoming the problems of prior penetration phosphors for use in bright color display cathode ray tube indicators. On the phosphor display screen, $La_2 O_2 S$ particles are employed as host elements, with low concentrations of Tb and Eu ions present within the particle material for the desired flexible voltage control of red and green line spectral color emission from within a thin film of the host particles. Contrast is improved in the novel display system by use of a dual narrow pass band filter combining individual filter layers and operating cooperatively with the natural spectral sensitivity of the eye.

DESCRIPTION OF THE PREFERRED EMBODIMENTS

Figure 1:
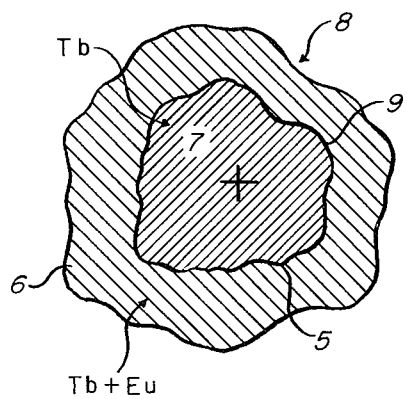
FIG. 1 is a cross section view of a representative penetration phosphor particle.

The invention is an improved optical filter system for employment with novel penetration phosphor cathode ray display tubes of the type disclosed in the aforementioned patent application Ser. No. 505,710. Such cathode ray tubes employ novel phosphors where the phosphors selectively generate narrow band or line fluorescence in two relatively widely separated parts of the visible spectrum, as in the red and in the green parts thereof. The novel optical filter system greatly enhances contrast of the display in the presence of reflection in high ambient light levels from the front of the cathode ray screen or viewing plate. Increased equivalent brightness of the color cathode ray display is consequently achieved, as is particularly desirable in difficult applications, such as in airborne displays or other similar displays where large ambient light levels must be tolerated.

In penetration phosphor cathode ray tubes of the type disclosed in patent application Ser. No. 505,710, lanthanum oxysulfide or $La_2 O_2 S$ is employed as the host material in a cathodo-luminescent penetration phosphor composition. As activators, terbium (Tb) and europium (Eu) ions are used in the controlled generation of green and red optical line emission from within the host material. The novel phosphor material is employed in particulate form, the Tb ions being supplied as $Tb_2 O_2 S$ within the particles and the Eu ions in the form of $Eu_2 O_2 S$. The activator concentrations are preferably very low compared to that of the host. In the representative phosphor particle 8 of FIG. 1, the Tb ion concentration is substantially homogeneous and the Eu ion concentration is preferably increased radially within the particle from substantially the effective geometrical center 7 of the latter. In particular, the Eu concentration may be substantially zero at the interface 9 and also within the central region 5 and may increase in the outer region 6 from interface 9 toward the surface of particle 8. Because the phosphor composition of the particle is made up entirely of mutually compatible rare-earth oxysulfides, problems due to the often very different chemical and physical properties of prior art constituent materials are entirely avoided.

Figure 2:
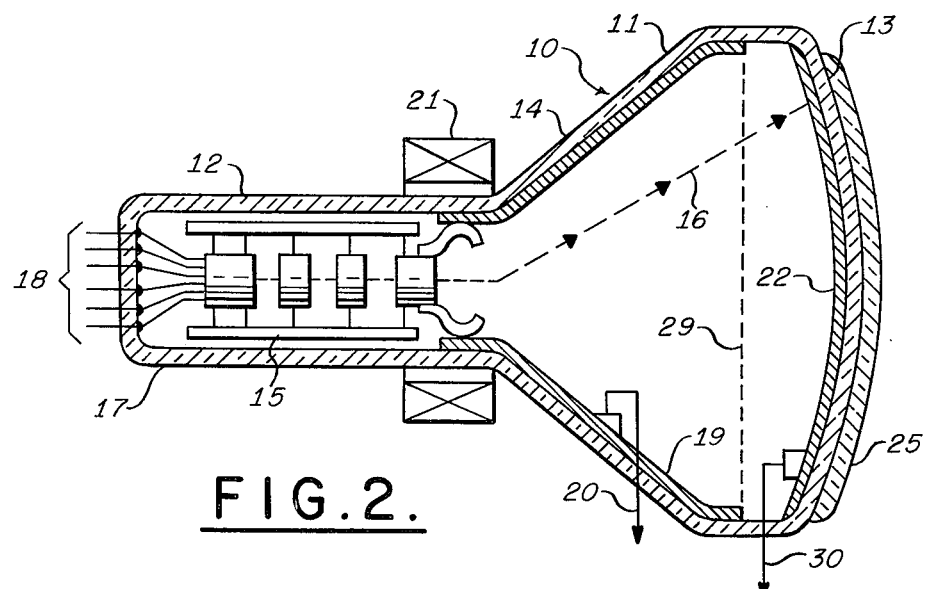
FIG. 2 is a cross section view of a representative penetration phosphor cathode ray vacuum tube display in which the novel optical filter system is used.

FIG. 2 illustrates a penetration phosphor cathode ray tube in which the present invention may be employed; the tube 10 consists of a vacuum envelope 11 including a neck 12, a viewing face plate 13, and a conically shaped transition section 14 for completing the vacuum envelope 11. An electron gun 15 is supported within the neck 12 and is adapted to project an electron beam represented by the dotted line 16 toward an inner surface of viewing face plate 13. The neck 12 is closed at its end opposite face plate 13 by a stem structure 17 through which a plurality of lead-in wires 18 is sealed. Suitable operating potentials may be applied to the electron gun 15 and to its associated cathode through the conductors 18. A conducting coating 19 is provided on the internal surface of the conical section 14 of envelope 11 and serves as an accelerating electrode for electron beam 16. A suitable high voltage is supplied from a conventional power supply (not shown) to the conducting coating 19 via a terminal sealed through the glass cone 14 as represented at 20. A magnetic deflection yoke 21 or other conventional electron beam deflection means is provided for positioning electron beam 16 with respect to face plate 13.

Figure 3:
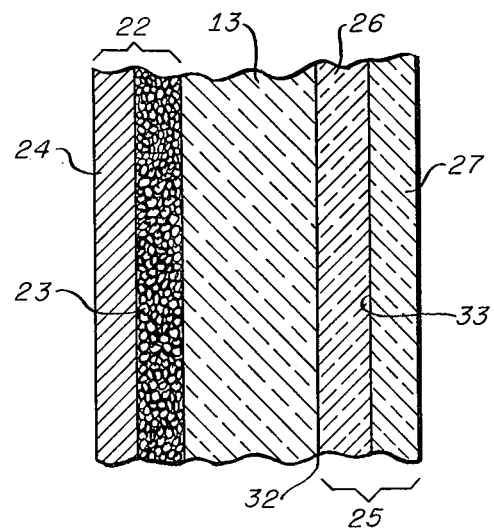
FIG. 3 is a magnified cross section of the viewing plate phosphor and filter elements of FIG. 2.

The luminescent penetration phosphor screen 22 is supported on the face plate 13 so that the deflected electron beam 16 may excite the phosphor particles of screen 22 to luminescence. FIG. 3 illustrates in greater detail the luminescent screen 22 which is composed in part of a layer 23 or cathodo-luminescent penetration phosphor particles. The layer 23 is characterized by including many phosphor particles and is substantially free of voids. The preferred penetration phosphor particles being very small, layer 23 is relatively thin. A visible light-reflecting aluminum layer 24 is supported directly upon phosphor layer 23; it is thin so that it may be readily penetrated by the electrons of beam 16. The display tube 10 may be provided with a mesh grid 29 disposed transversely within conical section 14. Where mesh grid 29 is used, it is connected electrically to the conductive coating 19 so that the display tube may operate according to conventional post-acceleration principles. A separate lead-in conductor as represented at 30 may be supplied for providing a suitable electrical potential to metal layer 24, such as a post-acceleration potential. Mesh grid 29 may be eliminated entirely, if desired.

Operation of the display as so far introduced may be described with reference to FIGS. 1, 2, and 3. Low velocity and hence, low energy, electrons of beam 16, present therein when a relatively low voltage is supplied to terminal 20, strike the surface of the phosphor particle 8 and transfer energy to the emission centers provided by the Eu and Tb ions located near the surface of particle 8 in region 6 to produce red spectral emission. If the acceleration voltage at terminal 20 is increased to a maximum value, the high energy electrons of beam 16 strike the phosphor particle 8 and penetrate it deeply. Accordingly, the energy of such electrons tends to be transferred to both kinds of activators with a substantial fraction of the energy transferred to the single type of activator located in the central region 5 which is the substantial portion of the volume of particle 8, where the Tb ions of region 5 tend to emit green light. Electrons of energy intermediate the foregoing two extremum values transfer energy to the green and red-emitting regions in intermediate amounts. The degree of generation of red or green light is arbitrarily controlled by the concentrations of activators and, in use, is controlled also by a conventional type of programmed voltage level power supply coupled to terminal 20.

In the operation of the penetration phosphor display, there is an additional important mechanism provided and it causes transfer of energy from the Tb to the Eu ions where both are coactivators in region 6, involving an induced change in the allowed transitions of electrons in the excited state of the atoms. In particular, the manner in which electrons belonging to the excited Tb ions are permitted to release their energy is changed in region 6 so that there no longer results visible green radiation from the Tb ions in region 6. At the same time as such a quenching action is effected, the Eu red emission mechanism is enhanced. In other words, the energy from electron beam 16 which would have been emitted as green light by the Tb ions of region 6 is now in part transferred to enhance the red radiation of the Eu ions and is in part dissipated in nonradiative electronic transitions.

The emission produced by the $La_2 O_2 S$ phosphor is sensitive to the concentration of its activators. There is a maximum energy conversion efficiency for a particular concentration of activator, efficiency dropping severely for lower and high concentrations. As the second activator (Eu) is added, the additional quenching effect appears, only a small amount of Eu being sufficient to quench Tb green emission. The optimum molar Eu ion concentration is about six times as great as the optimum molar Tb concentration, but there is a moderate range of values of the activator concentration ratios which proves useful in eliminating green emission from the Tb ions. The Tb ion is much more sensitive to changes in its concentration than is Eu and the over-all beneficial effect of having Eu ions in the outer section 6 of the $La_2 O_2 S$ particles is to eliminate green radiation from the Tb ions with region 6.

The total effect of the energy-transfer mechanism, of the preferred activator concentration ratios, and of the quenching mechanism is to cause region 6 to operate in the effective manner of the totally different inert barrier layers found in the prior penetration phosphor art. In such prior art inert or non-radiating barriers, energy is simply lost as heat and is not usefully or efficiently converted to visible radiation as it is in part of the present penetration phosphor. Commercial penetration phosphors of the past use non-emitting or dead layers as barrier layers on sulfides such as $Zn S : Co$. In the present kind of penetration phosphor, the green-emitting rare-earth phosphor emits light at a longer wave length at low electron beam voltages, green emission occurring only at high electron beam voltages.

The desirable range of molar concentrations of Eu ions with respect to the host material is experimentally established as lying between 0.001 and 0.1 moles per mole of the host $La_2O_2S$. Successful barrier phosphors have been demonstrated within such ranges and are also found to produce penetration phosphors of superior nature when mixed with red-emitting phosphors such as $YVO_4 : Eu\ VO_4$. The usual range of weight ratios of the barrier phosphor $La_2O_2S : Tb_2O_2S : Eu_2O_2S$ to the red-emitting phosphor $YVO_4 : Eu\ VO_4$ lies substantially between 8 to 1 and 2 to 1. These latter ranges are, of course, very easily determined in an ordinary mechanical fashion simply by mixing reasonably selected proportions of the barrier and the red-emitting phosphors until the desired color range under operating voltages is obtained.

Figure 4:
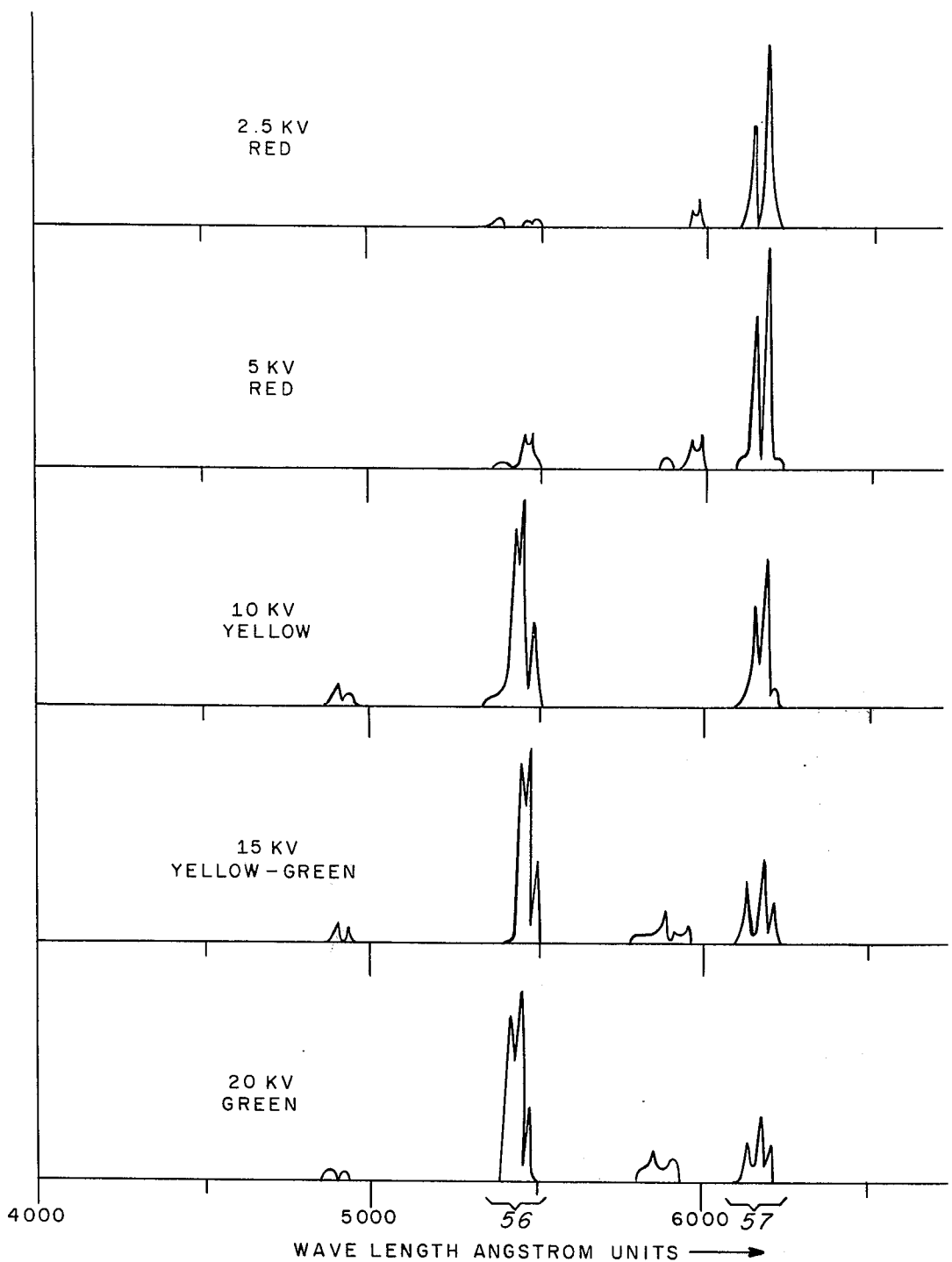
FIGS. 4 through 7 are graphs useful for explaining the character of the novel display apparatus.

Actual spectral energy distributions for a representative penetration phosphor are illustrated in FIG. 4 for 2.5, 5, 10, 15, and 20 kV. electrons. The emission is narrow line emission under all conditions. Since the color perceived by the eye is a combination of the varying red and green components, red is seen at 2.5 and 5 kV., yellow at 10 kV., yellow-green at 15 kV., and substantially green at 20 kV. It should be noted that FIG. 4 shows only the relative intensities of the green and red lines at each electron beam voltage, and is not necessarily meant to indicate the exact relationship between the intensities of different voltages. Other aspects of the new penetration phosphor cathode ray display tube are discussed in the aforementioned patent application Ser. No. 505,710, which application is incorporated in its entirety in the present specification.

The filter system 25 of the present invention, as seen in FIGS. 2 and 3, is placed between the exterior surface of the viewing plate 13, which plate has a relatively constant transmission characteristic throughout the visible spectrum, and the observer and may be self-supporting or bonded directly to the outer surface of viewing plate 13 as generally indicated in FIG. 2 in the conventional manner. As further seen in FIG. 3, the filter system 25 consists of two contiguous filter layers 26 and 27 which may be mutually bonded together at interface 33 as well as being fastened to plate 13. Such bonding, if used, may be accomplished by application of available materials such as conventionally employed synthetic polyester resins having good optical transmission and indices of refraction optically matching those of the elements being bonded together. A conventional anti-reflection coating (not shown) may be applied to the exterior or front surface of filter layer 27.

Filter layer 26 is preferably a didymium glass filter, while filter 27 is a temperature colored glass filter, though the order of the filters may be reversed. With particular respect to the didymium glass filter 26, this is preferably a 9 mm. thick glass filter plate of the class generally known by the standard designation BG20 having substantially the measured transmission characteristics shown by the three-lobed curve 50 of FIG. 5. The filter action is produced because of colored ions of didymium in true solution in the glass. The transmission curve features three distinct pass bands, a first relatively narrow pass band 51 being centered at about 4935 Angstrom units and approaching 0.6 relative transmission there. A second and more important pass band 52 is relatively symmetric, being centered at about 5525 Angstrom units with about 0.8 relative transmission and having sides dropping to about 0.4 relative transmission at about 5405 and 5635 Angstrom units, respectively. The third relatively wide pass band region reaches about 0.42 relative transmission at about 6120 Angstrom units and exceeds 0.7 transmission between about 6150 and about 6750 Angstrom units. Between bands 52 and 53, relative transmission drops substantially to zero. In place of the BG20 filter, a BG36 filter may be used in some circumstances.

Figure 5:
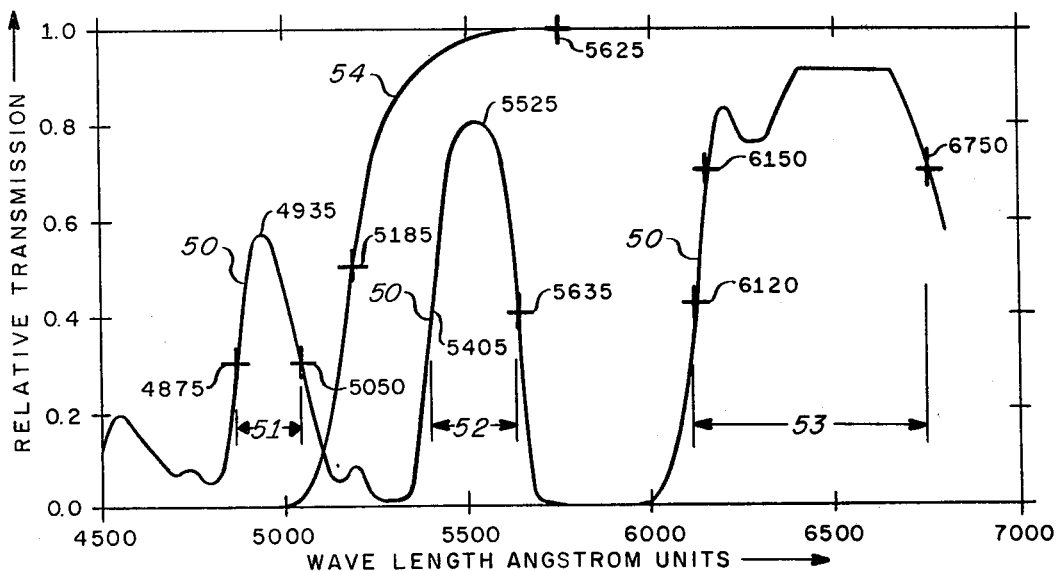

The filter layer 27 of FIG. 3 comprises a 3 mm. thick plate of temperature colored glass of the class generally known by the standard designation OG515 and having substantially the measured transmission characteristics of curve 54 of FIG. 5. Also, and OG530 filter may be substituted. The filter action is produced by coloring agents in the form of microscopic particles in either filter. The transmission curve 54 rises from substantially zero transmission at about 5000 Angstrom units through the 0.5 relative transmission point at about 5185 Angstrom units and asymtotically reaches a unity transmission plateau at about 5626 Angstrom units. In this manner, it is seen that the termperature colored glass filter 27 beneficially negates the presence of the pass band 51 of the didymium filter layer 26. Thus, the undesired lines in the penetration phosphor spectrum appearing in FIG. 4 that lie below about 5000 Angstrom units are heavily attenuated. Furthermore, lines in FIG. 4 lying just below 6000 Angstrom units are also substantially removed.

Figure 6:
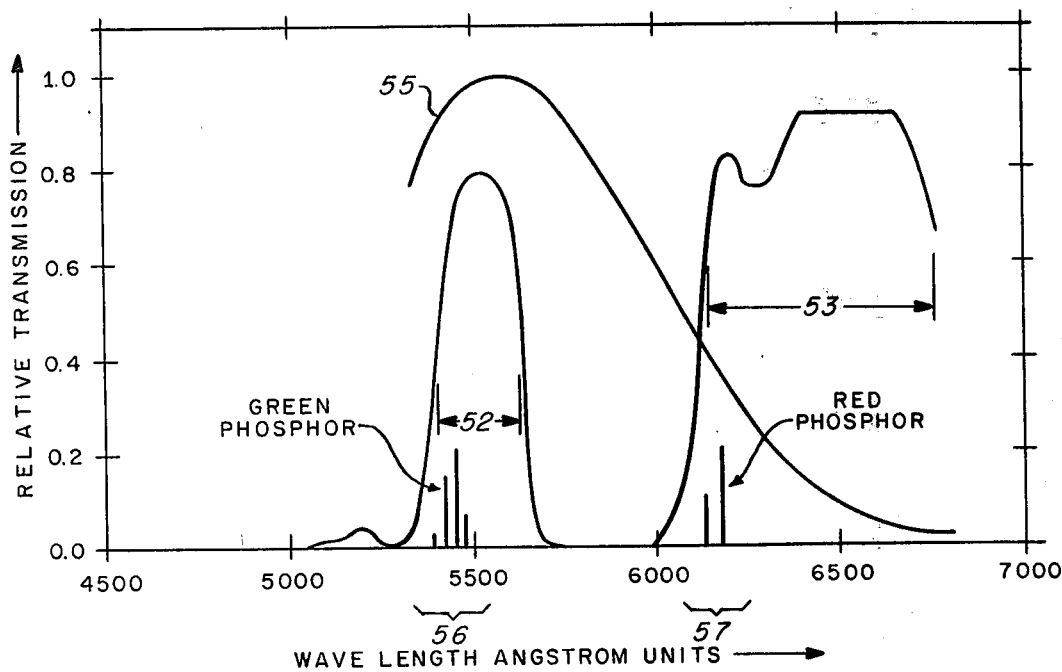

The composite effect of the component filters 26, 27 of the filter system 25 is seen in FIG. 6. The desired pass band 52 of the didymium filter 26 is preserved and permits passage of the green spectral lines of the penetration phosphor system the line set 56 being shown in the drawing in conventional line rather than in envelope form as a matter of convenience. The major line of the line set 56 lies near the maximum transmission point of pass band 52.

In a generally similar manner, the reddest line of line set 57 of the phosphor system lies within pass band 53 at a point of nearly maximum light transmission for the filter system. The brightness of the line spectra is further modified by the cooperating spectral response of the eye, as illustrated in representative manner by the sensitivity curve 55.

Of the several fundamental factors that have a bearing on seeing, contrast is a significant one. Brightness contrast is generally important, but the present invention aids the viewer also by providing sharply contrasting color images because of the selected spectral lines used therein. Improved brightness contrast is obtained with the present invention because the ambient white light striking the front of the cathode ray tube generally contains visible light over the whole wave length range from 4500 to 6500 Angstrom units. As this light passes through the filter system 25, the wave length components in the two stop bands 4500 to 5300 Angstrom units and 5700 to 6000 Angstrom units are attenuated. The ambient light is scattered off the phosphor 23 and the aluminum layer 24 and, before reaching the eye, passes through the filter system 25 once more, where wave length components in the two stop bands are further attenuated. The total attenuation results in a greatly reduced intensity of scattered ambient light reaching the eye. At the same time, the green and red wave length components from the phosphors are not greatly attenuated in passing through the filter system 25, since these wave lengths coincide with pass bands for the filter system, and the contrast is greatly improved.

Figure 7:
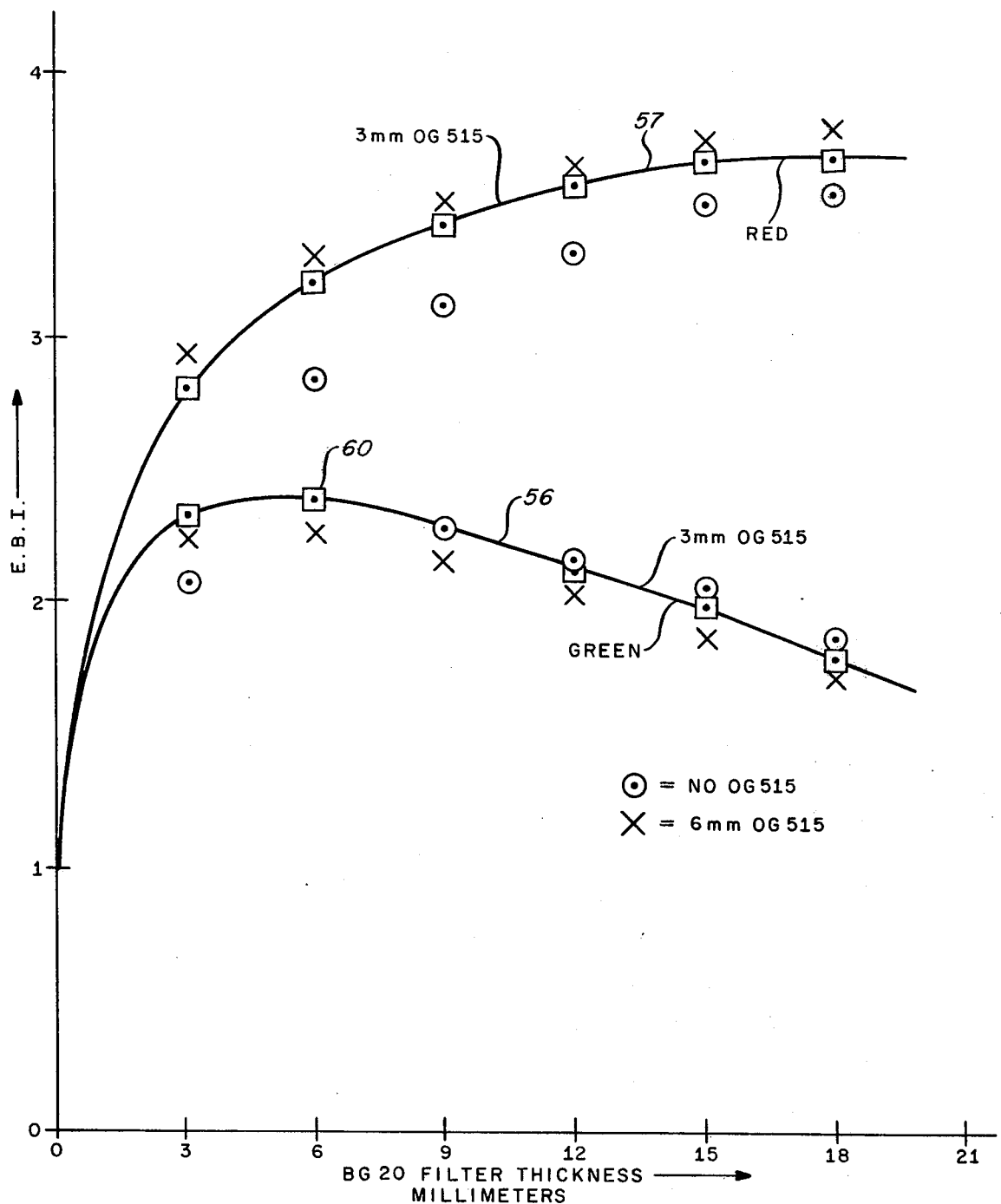

A practical way of evaluating the present invention is through the use of a figure of merit called herein the equivalent brightness increase EBI. The equivalent brightness increase factor EBI is the ratio of the brightness of the phosphor as viewed through the dual pass band filter of the present invention to the brightness of the same phosphor when viewed through a conventional neutral density filter which provides the same brightness contrast enhancement as the dual pass band filter of the present invention. Using this ratio, the merit of the invention is illustrated by the graphs of FIG. 7 for filter systems using various thicknesses of BG20 and OG515 glass filters with the green and red line sets 56, 57 of FIGS. 4 and 6. FIG. 7 shows the unexpected beneficial result of the novel combination of the dual pass band filters with the penetration phosphor system of the prior patent application; note the optimum equivalent brightness increase EBI of about 2.4 for the green light set 56 with a 6 mm. BG20 filter associated with 0, 3, or 6 mm. OG515 filters at location 60. For the same 6 mm. thickness for the BG20 filter, the EBI value averages above 3 for the red line set 57, continuing to rise with BG20 filter thickness, being about 3.20 for a 6 mm. OG515 filter thickness. According to the invention, it is particularly beneficial that the EBI ratio is greatest for the red line set 57, this improvement being needed for two reasons. The red lines produced by the selected phosphor, as is generally true of red penetration phosphors, are already of relatively low brightness before they are submitted to the action of the novel filter, the red phosphors being less efficient than the green. Secondly, the natural sensitivity of the eye is low at the red end of the spectrum, as illustrated by curve 55 of FIG. 6. Accordingly, the mechanism producing the equivalent brightness increase ratio EBI is particularly valuable in making the vary-colored image, as seen by the eye, of standard brightness.

The generally similar BG20 and BG36 filters may be selectively chosen in a moderate range of relative thickness for cooperative use with a moderate range of thicknesses of the generally similar OG515 and OG530 filters to provide a range of beneficial effects on the relative green and red color contrast, but a preferred combination lies in the use of a 9 mm. thick BG20 filter with a 3 mm. thick OG515 filter. This combination demonstrates the transmission curve of FIG. 5 and the following properties:

|  | Contrast Enhancement | Transmission Coefficient | EBI |
| --- | --- | --- | --- |
| Green line set 56 | 3.5 | 0.64 | 2.2 |
| Red line set 57 | 4.3 | 0.79 | 3.4 |

If a higher degree of contrast enhancement is desired, a conventional neutral density filter may be added to the foregoing combination, producing the following results:

| Green line set 56 | 11.1 | 0.20 | 2.2 |
| --- | --- | --- | --- |
| Red line set 57 | 13.6 | 0.25 | 3.4 |

It should be observed that an additional benefit obtained in combining the novel dual pass band filter with the described penetration phosphor system lies in the improvement in the color of the green phosphor emission. The phosphor $La_2 O_2 S : Tb$ has its stronger emission within the range of 5425 to 5500 Angstrom units, but with subsidiary emission lines near 4900 and 5850 Angstrom units. These undesired lines are greatly attenuated by the novel filter systems.

Accordingly, by use of the novel penetration phosphor display-dual pass band filter system, a cockpit cathode ray tube display may be greatly improved, reflections of high ambient light levels entering the front of the display tube being substantially reduced by the attenuating regions of the dual pass filter system operating in cooperation with the natural color sensitivity of the normal eye. The two pass bands coincide substantially with the narrow band spectral line sets 56, 57 of the employed rare earth phosphors. Other filters, such as interference filters, are not suitable for the application, since their transmission characteristics change drastically with the viewing angle, even though their pass bands are relatively narrow. The filter system combining didymium and temperature colored glass filters provides a significant increase in the effective brightness of the cathode ray tube display. Ambient reflected light, especially that diffusely scattered by the penetration phosphor layer itself, is a major part of the undesired light and is efficiently removed according to the invention. Since the light is diffusely scattered light, circularly polarizing filters sometimes used do not significantly improve contrast in the present case and are therefore not competitive with the device of the present invention.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. The combination of an optical filter system and a penetration phosphor cathode ray display tube having a phosphor screen composed at least of particles of a La host phosphor each with at least a central region having a substantially uniform distribution of Tb ions and a peripheral region containing a radially increasing distribution of Eu ions such that relatively low velocity electrons striking any one of said particles produce red spectral line optical emission and relatively high velocity electrons striking any one of said particles produce green spectral line optical emission, the optical filter system comprising contiguous filter elements including at least:

a first filter element having first, second, and third spaced apart narrow pass bands,
said first pass band being centered at about 4935 Angstrom units,
said second pass band being centered at about 5525 Angstrom units with a relative center transmission of about 0.8 dropping to about 0.4 relative transmission at about 5405 and 5635 Angstrom units, and
said third pass band having about 0.42 relative transmission at about 6120 Angstrom units and exceeding 0.7 relative transmission between about 6150 and 6750 Angstrom units, the relative transmission dropping to substantially zero between said second and third pass bands, and
a second filter element having a relative transmission rising from substantially zero at 5000 Angstrom units through about 0.5 relative transmission at about 5185 Angstrom units and asymtotically rising to a unity transmission plateau at about 5626 Angstrom units, thereby substantially negating the effect of said first pass band, said first and second filters cooperatively operating with respect to the natural spectral response of the normal eye to provide enhanced brightness of said red and green spectral lines in the presence of ambient illumination of the face of said penetration phosphor cathode ray tube from substantially any forward angle.

2. Apparatus as described in claim 1 wherein said first filter element comprises a glass filter containing didymium ions.

3. Apparatus as described in claim 2 wherein said second filter element comprises a temperature colored glass filter.

4. Apparatus as described in claim 1 additionally including a third filter element in the form of a neutral density filter for further enhancement of the brightness of said red and green spectral lines.

5. Apparatus as described in claim 1 wherein said first filter element has a thickness lying between 3 and 12 mm. and said second filter element has a thickness lying between 0 and substantially 3 mm.

6. Apparatus as described in claim 5 wherein said first filter element has a thickness of substantially 9 mm.

* * * * *